March 14, 1967     H. F. SWANDA     3,308,529
TUBE COUPLING TOOL
Filed May 5, 1964     2 Sheets-Sheet 2
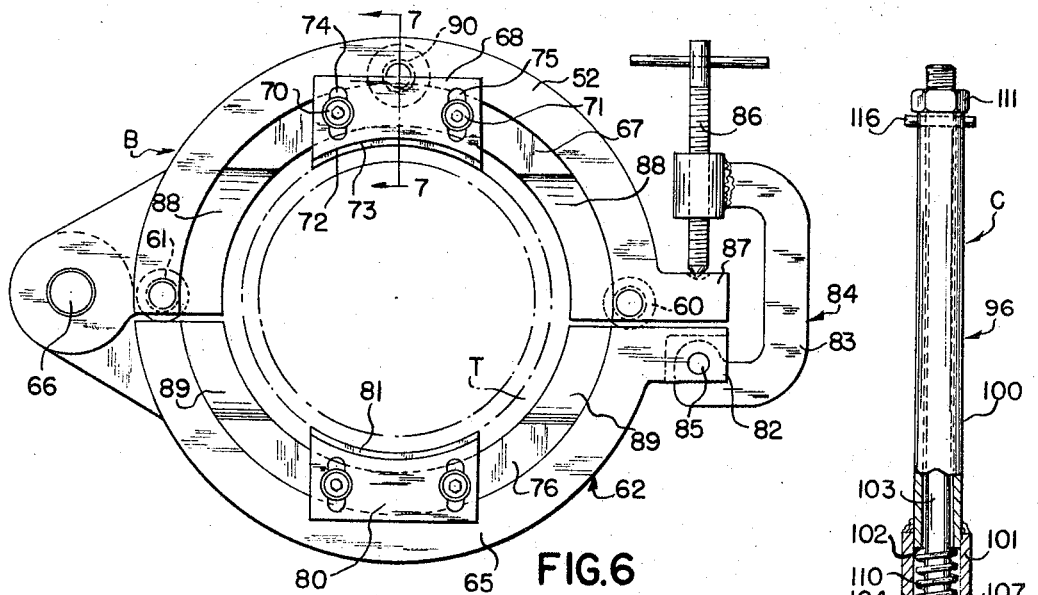
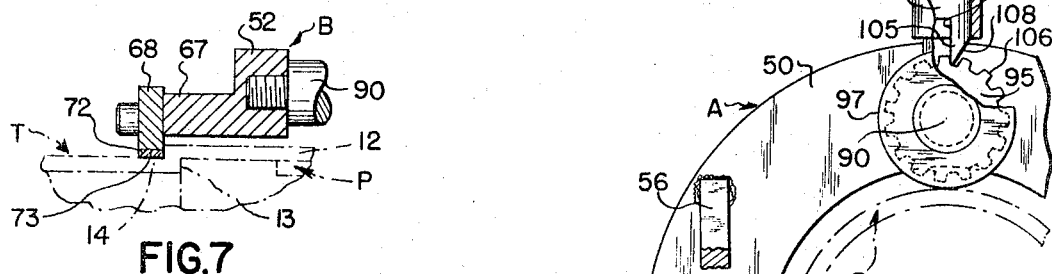
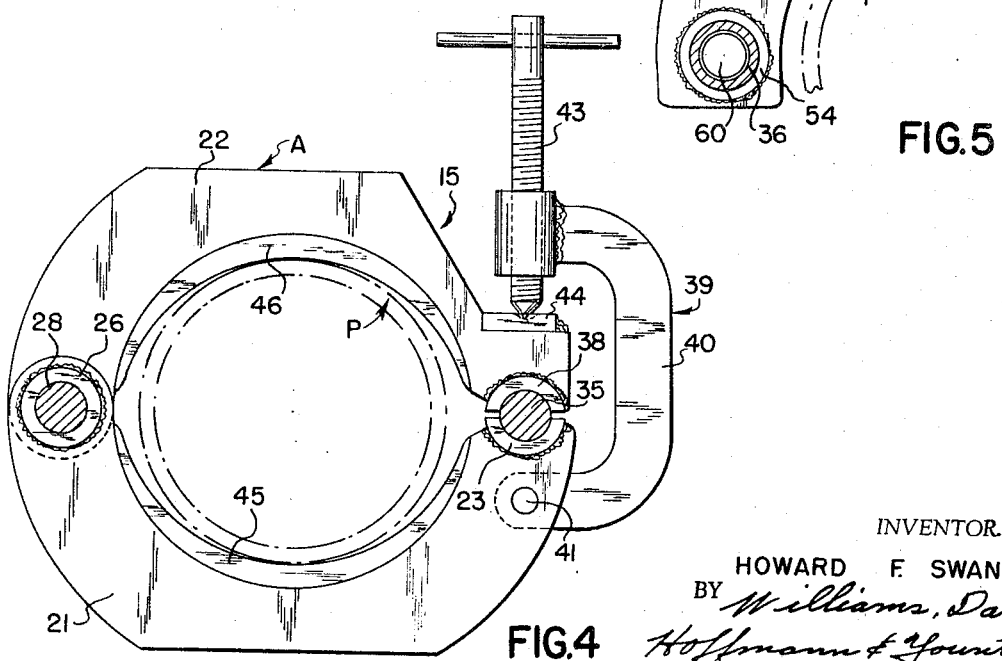
INVENTOR.
HOWARD F. SWANDA
BY Williams, David,
Hoffmann & Yount
ATTORNEYS

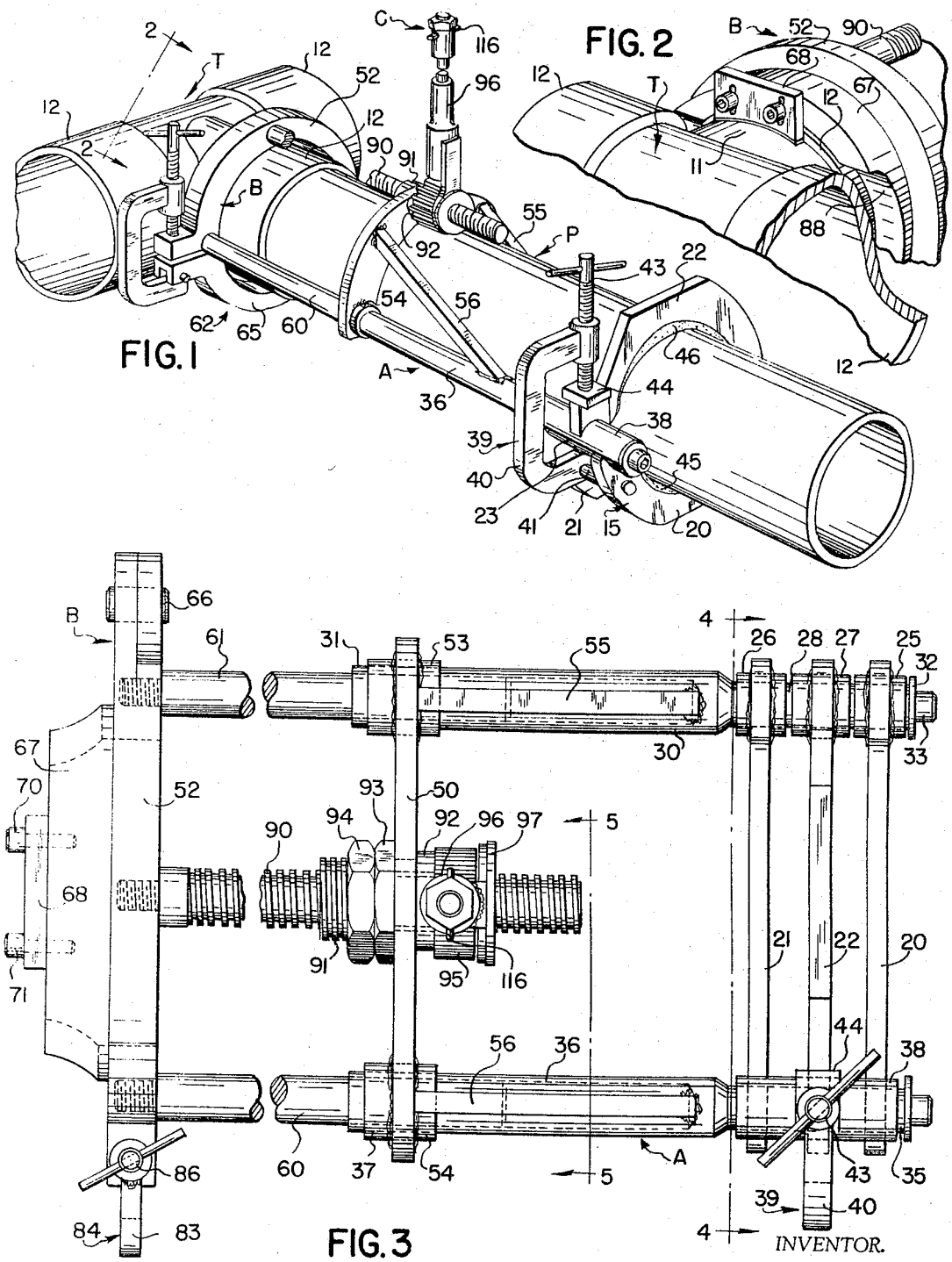

United States Patent Office 3,308,529
Patented Mar. 14, 1967

3,308,529
TUBE COUPLING TOOL
Howard F. Swanda, Rte. 1, Box 13, Hiram, Ohio 44234
Filed May 5, 1964, Ser. No. 364,938
4 Claims. (Cl. 29—237)

The present invention relates to the installation of plastic tubing and/or pipe and more particularly to a tool for facilitating the connecting or joining of plastic pipe members, for example, a section of plastic pipe to a plastic pipe fitting, such as, a tee.

Plastic pipe sections of the type with which the present invention is concerned are commonly joined together by fittings, such as, tees, elbows, etc. having openings into which an end of a pipe section to be joined thereto is telescoped and secured. Prior to inserting the end of the pipe into the fitting, an adhesive or solvent is ordinarily applied to the end of the pipe and/or the interior of the fitting and subsequent to the telescoping of the parts together the members are held assembled until the adhesive sets or the solvent evaporates and the parts are fixedly secured together.

The principal object of the invention is the provision of a novel tool for facilitating the assembly of plastic pipe members, that is, pipe and fittings of the character referred to and for holding them in assembled relationship until they are fixedly joined together.

The invention resides in certain constructions and combinations and arrangements of parts, and further objects and advantages of the invention will be apparent from the following description of a presently-preferred embodiment thereof, which is illustrated in the accompanying drawings.

In the drawings:

FIGURE 1 is a perspective view, with parts broken away for clarity, showing a tool of the present invention holding two pipe members in partial assembled relationship;

FIGURE 2 is a fragmentary perspective view, on a larger scale, taken from the line 2—2 at the left end of the assembly in FIG. 1;

FIGURE 3 is a top plan view of the tool shown in FIG. 1 with parts broken away and the two assembled pipe members in phantom;

FIGURE 4 is a sectional view taken along the line 4—4 in FIG. 3;

FIGURE 5 is a fragmentary view, with certain parts broken away for clarity, taken from the line 5—5 in FIG. 3;

FIGURE 6 is an end elevational view looking from the left of FIG. 3; and

FIGURE 7 is a fragmentary sectional view taken along the line 7—7 in FIG. 6.

The tool comprises first and second clamp assemblies, designated generaly as A and B, one adapted to grip the pipe and the other the fitting and be moved relatively toward one another to telescopingly engage the pipe into the fitting and hold the members assembled until the pipe and fitting are securely joined together. It being understood that prior to the insertion of the pipe in the fitting, a solvent or adhesive is applied to the pipe and/or the interior of the fitting. In the tool shown, manually operable mechanism, designated generally by the reference character C, is employed for moving or drawing the two clamp assemblies A and B toward one another to insert the end of the pipe aligned with an opening of the fitting with which it is to be connected.

The drawings illustrate the tool as it is employed to connect a relatively large-size pipe P to the opening of the central leg 11 of a tee T. The tee T has enlarged collar portions 12, as is the usual practice, at its opposite aligned ends and at the free end of its central leg or connection and into which the ends of pipes to be connected thereto and in turn together are to be inserted. The interiors of the enlarged collars 12 terminate in annular shoulders 13 (FIG. 7) and the exteriors thereof in exterior shoulders 14. The interior shoulders 13 limit the extent or distance to which the ends of pipe to be connected to the tee T can be inserted therein.

The first clamp assembly A, which is the clamp assembly adapted to be connected to the pipe P, comprises a clamp proper designated 15 including a pair of axially spaced, generally semi-circular, lower clamp arms or members 20, 21 each defining an upwardly facing recess for receiving the lower half of the pipe P and a similarly shaped, generally semi-circular, upper arm 22 facing in the opposite direction and positioned midway between the lower arms 20, 21 and having a downwardly-facing recess for receiving the upper half of pipe P. The two lower arms 20 and 21 at the front side of the clamp in FIG. 1 are rigidly interconnected as by being welded to a short semicircular or half tubular member 23. At the opposite or far side of the pipe, the two lower arms 20, 21 and the upper arm 22 are welded to short collar members 25, 26, 27, respectively, rotatably mounted on a horizontal bar portion 28 of circular cross-section forming the right hand end of a member 30, the other or left hand end 31 of which is tubular. The portion 28 of the member 30 is of reduced diameter relative to the remainder of the member and the respective sleeves 25, 26 and 27 which are loosely received by bar 28 so that they may be turned thereon are retained assembled on the bar by a washer 32 interposed between the left hand end of the member 25 and a bolt 33 threaded into a tapped aperture in the end of the member 30. The semicylindrical, half-sleeve 23, presents an upwardly-facing recess which receives a horizontal bar section 35 of circular cross-section forming the right-hand end of a member 36 at the near side of the pipe which member 36 is the counterpart of the member 30 at the far side of the pipe. Like the member 30 the member 36 has a tubular left-hand end portion 37. The upper arm, 22 of the clamp carries a similar half-sleeve member 38 welded to the free end thereof and which presents a downwardly-facing recess for engaging the top of the bar portion 35 of the member 36.

The upper and lower clamp jaws or members of the clamp 15 are adapted to be clamped about the pipe by a C-clamp 39, including a member 40 pivotally mounted on a bolt 41 carried by and extending between the two lower arms 20, 21 of the lower clamp jaw. The C-clamp member 40 has at its end opposite the pivot 41 a screw-threaded passage which threadedly receives a screw 43. The inner end of this screw is adapted to engage a bearing plate 44 fixed to the upper clamp arm 22 above the half-sleeve 38. The C-clamp 39 is employed for drawing the free ends of the upper and lower clamp members together, or more particularly urging the half-sleeve members thereof toward and/or into engagement with the bar 35.

The inner pipe engaging portions of the lower clamp arms 20, 21 and the upper clamp arm 22 are preferably faced with a deformable material 45, 46, respectively, for example Babbitt metal, for engagement with the pipe 10. The purpose of these liners is to minimize, if not entirely eliminate, maring of the pipe. These liners may be provided with serrated edges, as desired. To accommodate the clamp to different size pipe the facings referred to can be formed on removable members which can be interchangeably attached to the upper and lower clamp members proper. With the arrangement described, the C-clamp screw 43 is turned in one direction causing the bar 35 to be secured between the half-sleeves 23 and 38 carried respectively by the lower arms 20, 21 and the upper arm 22 of the pipe clamp, and the pipe 10 to be clamped tightly between the lower clamp arms 20, 21 and the upper clamp arm 22. Alternatively, by turning the screw 43 in the opposite direction, the C-clamp can be released and the upper and/or lower jaws of the pipe clamp swung about their pivot on bar 28 to release the pipe 10.

The clamp assembly A includes a member 50 in the form of an inverted C-shaped or semi-circular yoke plate disposed axially between the clamp member 22 of the clamp assembly A and its counterpart 52 of the clamp assembly B that is, intermediate the clamp assemblies. Opposite ends of the member 50 are welded to sleeve members 53, 54 rigidly connected to the front or left-hand ends of the tubular portions 31, 37 of the members 30, 36 respectively.

The yoke plate or intermediate member 50 extends over the top of pipe P and is spaced from the pipe. Diagonal braces 55, 56 welded to the member 30, 36, respectively, and to the yoke plate 50 enhance the rigidity of this assembly.

The sleeves or tubular end portions 31, 37 of the members 30, 36 together constitute a guide means for the second clamp assembly B. For this purpose, the sleeve or tubular portion 37 of the member 36 at the front side of the pipe P in FIG. 1 slidably receives a rigid, horizontal, axially extending bar 60, whose opposite end is threadedly attached to the near end of the top semi-circular clamp member 52 of the second clamp assembly B and the corresponding sleeve portion of the member 30 at the back side of the pipe slidably receives a rigid, horizontal, axially extending bar 61, whose opposite end is threadedly attached to the far side or end of the member 52. The bars 60 and 61 constitute a second guide means interfitting slidably with the first guide means 30 and 36.

The second clamp assembly B comprises a clamp proper designated generally as 62 and in addition to the clamp jaw or member 52 includes a second semi-circular lower jaw or arm 65, presenting an upwardly-facing recess for receiving the lower half of the enlarged end portion 12 on the center leg of the tee T, the generally semi-circular upper arm or member 52 presenting its downwardly-facing recess for receiving the upper half of this end member 12. As previously mentioned the horizontal bars 60, 61 are both fixedly attached to the upper arm 52 of this clamp. The lower and upper clamp arms 52 and 65 are pivotally interconnected by a pivot pin 66 located at the far side of the assembly in FIG. 1.

As shown in FIG. 3, the left hand side of the upper arm 52 of the clamp 62 has an integral protruding flange 67, to which a thrust plate 68 is bolted as by bolts 70, 71. This thrust plate has an arcuate, radially inward edge 72 (FIGS. 6 and 7), and a Babbitt metal liner 73 secured to this edge. Both this edge and the liner engage behind the usual annual external shoulder 14 on the tee T at the inner end of the latter's enlarged portion 12. The thrust plate has a pair of elongated, laterally spaced, vertical slots 74, 75 which receive the bolts 71, 72 which attach the thrust plate 68 to the upper arm 52 of this clamp. With this arrangement, the radial position of thrust plate 68 is adjustable to accommodate different size fittings, etc. The lower arm 65 of the clamp 62 has a flange 76 protruding forwardly as viewed in FIG. 6, that is in the same direction as the flange 67 of the upper jaw member 52. This flange carries a thrust plate 80 similar to the thrust plate 68, previously referred to, and connected to the flange 76 in a manner similar to that in which the thrust plate 68 is connected to the flange 67, see FIG. 6. The arcuate inner edge of this plate and the Babbit metal liner 81 thereat engage behind the external shoulder 14 on the tee T at a location diametrically opposite thrust plate 68.

At the front side of the tool, as viewed in FIG. 1, the lower arm 65 of clamp 62 has a laterally protruding, bifurcated extremity 82 within which a member 83 of a C-clamp 84 is pivotally supported on a horizontal pivot pin 85. The upper end of this C-clamp member has a screw-threaded passage which threadedly receives a screw 86. The lower end of this screw is adapted to bear down against a laterally protruding extremity 87 of the upper clamp arm 52, when overlying the protruding extremity 82 of the lower clamp arm 65. With this arrangement, when the screw 86 is turned in one direction it forces the upper and lower arms 68, 80 of the clamp 62 tightly against the tee to the left of the enlarged end 12 thereof, with the respective thrust plates 68, 80 engaging or in position to engage behind the external shoulder 14 of the back or left-hand end of the collar 12. The clamp can be released from the tee by first turning screw 86 in the opposite direction, disengaging the C-clamp from the upper arm 52, and then pivoting the lower clamp arm 65 downwardly about its pivot 66 to release it from the tee.

The protrusion of the flanges 67 and 76 decreases gradually on both sides of the thrust plates 68 and 80 toward the ends of the flanges. This construction produces arcuate-shaped faces 88, 89 on the protruding ends of the flanges which conform them more or less closely to the contour of the fitting when the tool is used to join a pipe section to an angular fitting, for example, a side opening of a tee. This variation in the protrusion of the flanges 67, 76 may or may not be advantageous depending upon the construction of the particular pipe fittings with which the tool is used.

The two clamp assemblies, A, B are adapted to be moved relative to one another by the mechanism C which comprises a horizontally disposed screw 90, the left-hand end of which is reduced and threadedly secured in a suitably tapped aperture in the member 52 midway between its ends. The screw 90 extends above the top of the tee and above the pipe and is threadedly received in a flange nut 91 fixedly carried by the yoke plate 50.

The right-hand end of the nut 91, as viewed in FIG. 3, is provided with an enlarged flange 92 which bears against the right-hand side of the yoke plate 50. The opposite or left-hand end of the nut 91 is threaded for the reception of two jam nuts 93, 94 located at the left-hand side of the yoke member 50. The flange 92 and the jam nuts 93, 94 referred to, hold the nut 91 against axial movement relative to the yoke member 50 while permitting rotation of the nut therein. For facilitating rotation of the nut 91, a ratchet gear 95 is fixedly secured to the right-hand end of the flange 92.

A handle 96 is provided for enabling the operator to turn the nut 91 manually. This handle is pivotally mounted on the screw by means of an annular plate 97 rotatable on the screw and fixed to the handle. As shown in FIG. 5 the handle 96 comprises two telescopically interfitting, upper and lower tubular sleeve members 100, 101 welded to one another. The lower end of the upper sleeve 100 which projects a short distance into the lower member 101 defines a downwardly-facing annular shoulder 102 within the lower sleeve 101. An elongated stem or shaft 103 is slidably disposed in the sleeves. At its lower end this shaft carries an enlarged head 104 having a ratchet tooth 105 for engagement with the ratchet gear teeth 106 on the nut 91. The ratchet tooth has a radial face 107 for torque-transmitting engagement with the adjacent left hand tooth of the ratchet gear when the handle 96 is moved in a counterclockwise direction as viewed in FIG. 5, that is, in the direction to move the screw 90 to the right relative to the nut and an opposite inclined or sloping face 108 adapted to ride over the teeth on the ratchet gear when the handle is moved in the reverse direction. A coil spring 110 is engaged under compression between the internal shoulder 102 and the head 104 to bias the ratchet tooth 106 into engagement with the threaded and it carries a nut 111 which normally engages the upper end of sleeve 100 and may be used to limit radially inward movement of the ratchet tooth or pawl.

With the arrangement described, when the handle 100 is turned counterclockwise in FIGS. 1 and 5, the radial face 107 on the ratchet tooth 105 engages the adjacent tooth of gear 95 and causes the gear and in turn the nut 91 to turn in unison with the handle. This causes the pipe clamp assemblies A and B to be drawn together axially. When the handle 100 is turned counterclockwise in FIGS. 1 and 5, the inclined opposite face 108 of the ratchet tooth 105 rides over the teeth on the ratchet gear 95, so that the corresponding rotation is not imparted to the ratchet gear and the nut 91.

The upper end of the tubular member 100 is provided with a cross slot opening into the upper end thereof and the upper end of the plunger of shaft 103 is provided with a transversely extending pin 116 secured thereto. The location of the slots is such that when the pin 116 rests therein, as shown in FIG. 5, the radial face 107 of the pawl tooth 105 is in the position shown in FIG. 5, but the shaft 103 can be lifted and rotated 180° to reverse the position of the pin 116 in the slots 115 and thus reverse the direction in which the radial face 107 of the pawl tooth 105 faces thus making the ratchet mechanism reversable. The handle 96 can thus be operated to rotate the nut 91 in either direction relative to the screw 90. This permits the tool to be employed to move pipe members away from one another as well as draw the same toward one another, as desired.

In operation, the tool can be assembled with the two pipe members to be connected or joined together in any suitable manner, as by placing the tool on top of the members while supported in their approximate telescoping positions with the bottom arms 20, 21 of clamp 15 and the bottom arms 65 of clamp 62 hanging downwardly with respect to the other parts of the tool as the tool is viewed in FIGS. 1, 4 and 6. Thereafter the bottom halves of the respective clamps can be swung upwardly underneath the respective pipe members to be clamped therein and the clamps secured to the respective members by proper manipulation of the C-clamps 39, 62, as previously described. The handle 96 of the manually operable mechanism C for moving the clamp assemblies relative to one another can then be actuated to telescope the adjoining ends of the pipe members. After the pipe members are fixedly secured together in the desired manner, the clamps 15, 62 proper of the clamp assemblies A, B can be opened by disengaging the C-clamps 39, 84 and the tool removed.

It can be seen from the foregoing that I have provided a tool for assembling pipe sections or members comprising a first releasable clamp for supporting and gripping one pipe member, a second releasable clamp for supporting and gripping the other pipe member, means acting between two clamps for aligning them, and manually operable means active between the two clamps for drawing them together while maintaining them aligned and continuously gripping the respective pipe sections.

While a presently-preferred embodiment of the invention has been described in detail and illustrated in the accompanying drawings, it is to be understood that the invention is not limited to the particular arrangement shown, and it is my intention to cover hereby all adaptations, modifications and changes therein which come within the practice of those skilled in the art to which the invention relates and the scope of the appended claims.

Having described my invention, I claim:

1. A tool for assembling two pipe sections having ends which interfit telescopically, said tool comprising:
   a first clamp constructed and arranged to surround and support and grip one of said pipe sections;
   a second clamp spaced axially from said first clamp and constructed and arranged to surround and grip the other of said pipe sections;
   a member disposed axially between said clamps;
   rigid first guide means extending axially from said member toward said first clamp;
   rigid second guide means extending axially from said second clamp into slidably interfitting engagement with said first guide means;
   means connecting said first clamp to said first guide means;
   and means acting between said member and said second clamp and selectively operable to draw them together, whereby to draw said first and second clamps together.

2. A tool for assembling two pipe sections having ends which interfit telescopically, said tool comprising:
   a first clamp having relatively movable parts constructed and arranged respectively to engage beneath and to overlie one of said pipe sections;
   a second clamp spaced axially from said first clamp and having relatively movable parts constructed and arranged respectively to engage beneath and to overlie the other of said pipe sections, releasable means for positioning said parts of the second clamp in gripping engagement with said other pipe section;
   a member disposed axially between said clamps;
   rigid first guide means extending from said member toward said first clamp;
   releasable means for positioning said parts of the first clamp in gripping engagement with said one pipe section and for causing said first clamp to grip said first guide means;
   rigid second guide means extending from said second clamp into slidably interfitting engagement with said first guide means;
   a screw carried by said second clamp and extending axially therefrom;
   means rotatably supported by said member and threadedly receiving said screw;
   and manually operable ratchet means for turning said last-named means to draw the second clamp and said member together, whereby to advance said first and second clamps axially toward each other.

3. A tool for assembling two pipe sections having ends which interfit telescopically, said tool comprising:
   a support member constructed and arranged to extend over the top of one of said pipe sections;
   a pair of parallel, hollow sleeves carried by said support member and extending horizontally therefrom in one direction axially, said sleeves being positioned to extend on opposite sides of said one pipe section;
   a pair of rigid bars extending endwise from said sleeves in said one axial direction;
   a first pipe clamp spaced axially from said support member in said one axial direction and comprising lower arm means pivoted one one of said bars and constructed and arranged to extend laterally therefrom toward the other of said bars and to define an upwardly-facing recess for receiving and supporting said one pipe section, upper arm means pivoted on said one bar and constructed and arranged to extend laterally therefrom toward the other bar and to define a downwardly-facing recess for receiving said one pipe section, said lower arm means at the end thereof remote from its pivotal support carrying a grip member constructed and arranged to snugly engage said other bar from beneath, said upper arm means at the end thereof remote from its pivotal support carrying a grip member constructed and arranged to snugly engage said other bar from above, and releasable means acting between said last-mentioned ends of the upper and lower arm means to clamp said grip members against said other bar and to clamp said upper and lower arm means against said one pipe section;

a second pipe clamp spaced axially from said support member in the opposite axial direction and comprising lower arm means defining an upwardly facing recess for receiving and supporting the other pipe section, upper arm means defining a downwardly facing recess for receiving said other pipe section, means pivotally supporting said last-mentioned lower and upper arm means at the same side as said one bar which pivotally supports the lower and upper arm means of the first clamp, releasable means acting between said upper and lower arm means of the second clamp for clamping the latter against said other pipe section;

a pair of horizontal bars attached to said upper arm means of the second clamp and extending axially therefrom slidably into said sleeves;

a screw carried by said upper arm means of the second clamp and extending axially therefrom toward said support member;

a nut rotatably supported by said support member and threadedly engaging said screw;

and manually operable ratchet means for turning said nut to draw the support member and first clamp, as a unit, and the second clamp toward one another.

4. A tool for assembling two pipe members having ends which interfit telescopically, said tool comprising:

a first clamp for encircling one of said pipe members and comprising first arm means for engaging one side of said one pipe member, second arm means for engaging the other side of said one pipe member, means pivotally supporting said arm means at one side of said one pipe member, and releaseable means for engagement with said arm means at the opposite side of said one pipe member to clamp said arm means tightly against said one pipe member;

a second pipe clamp for encircling one side of the other of said pipe members and spaced from said first clamp and comprising third arm means for engaging one side of said other pipe member, fourth arm means for engaging the other side of said other pipe member, means pivotally supporting said last-mentioned fourth arm means at one side of said other pipe member, and releasable means for engagement with said third and fourth arm means at the opposite side of said other pipe member to clamp said third and fourth arm means tightly against said other pipe member;

means for aligning said clamps;

and means acting between said clamps and selectively operable to draw the clamps together while maintaining them in alignment; wherein said second clamp includes a first thrust plate at one side of said third arm means which is away from said first clamp, said thrust plate terminating at an inner edge disposed radially inward beyond said third arm means for egagement behind an external shoulder on said other pipe member, means attaching said first thrust plate to said third means for adjustment radially, a second thrust plate at said one side of said fourth arm means of the second clamp and spaced from said first thrust plate, said second thrust plate terminating at an inner edge disposed radially inward beyond said fourth arm means for engagement behind said external shoulder on said other pipe section, and means attaching said second thrust plate to said fourth arm means for adjustment radially.

References Cited by the Examiner

UNITED STATES PATENTS

| | | | |
|---|---|---|---|
| 889,315 | 6/1908 | Kenyon | 254—29 |
| 1,094,978 | 4/1914 | Church | 29—237 |
| 1,927,688 | 9/1933 | McKee | 29—237 |
| 2,719,695 | 10/1955 | McKee | 29—237 |
| 2,920,383 | 1/1960 | Aydelott | 20—237 |
| 2,958,125 | 11/1960 | Nichols | 29—237 |

WILLIAM FELDMAN, *Primary Examiner.*

J. C. PETERS, *Examiner.*